US012024415B2

(12) United States Patent
Stang et al.

(10) Patent No.: US 12,024,415 B2
(45) Date of Patent: Jul. 2, 2024

(54) BEVERAGE BOTTLE AND CONTAINER HANDLING ARRANGEMENT FOR HANDLING BEVERAGE BOTTLES, CANS, OR SIMILAR CONTAINERS, AND A METHOD OF OPERATING A BEVERAGE BOTTLE AND CONTAINER HANDLING ARRANGEMENT

(71) Applicant: KHS GMBH, Dortmund (DE)

(72) Inventors: Siegmar Stang, Mainz (DE); Andreas Krieg, Dittelsheim-Hessloch (DE)

(73) Assignee: KHS GmbH, Dortmund (DE)

( * ) Notice: Subject to any disclaimer, the term of this patent is extended or adjusted under 35 U.S.C. 154(b) by 328 days.

(21) Appl. No.: 17/495,943

(22) Filed: Oct. 7, 2021

(65) Prior Publication Data

US 2022/0024745 A1    Jan. 27, 2022

Related U.S. Application Data

(63) Continuation-in-part of application No. PCT/EP2020/055507, filed on Mar. 3, 2020.

(30) Foreign Application Priority Data

Apr. 10, 2019  (DE) .................. 102019109446.1

(51) Int. Cl.
| | | |
|---|---|---|
| B67C 3/00 | (2006.01) | |
| B65G 29/00 | (2006.01) | |
| B67C 3/22 | (2006.01) | |
| B67C 3/24 | (2006.01) | |
| B65G 47/84 | (2006.01) | |

(52) U.S. Cl.
CPC ............... B67C 3/24 (2013.01); B65G 29/00 (2013.01); B67C 3/007 (2013.01); B67C 3/225 (2013.01); *B65G 47/846* (2013.01)

(58) Field of Classification Search
CPC ........... B67C 3/007; B67C 3/225; B67C 3/24; B65B 59/005; B65G 29/00; B65G 47/84; B65G 47/846
USPC .......................................... 198/473.1, 803.11
See application file for complete search history.

(56) References Cited

U.S. PATENT DOCUMENTS

| | | | | |
|---|---|---|---|---|
| 1,574,307 | A * | 2/1926 | Risser ...................... | B67C 3/24 198/803.11 |
| 4,124,112 | A * | 11/1978 | Mohney et al. ..... | B65G 47/847 198/479.1 |
| 5,394,975 | A * | 3/1995 | Bernhard .............. | B65B 59/005 198/473.1 |
| 8,905,226 | B2 * | 12/2014 | Langanki et al. . | B65G 21/2072 198/803.11 |

(Continued)

FOREIGN PATENT DOCUMENTS

| | | |
|---|---|---|
| DE | 102011054890 | 5/2013 |
| DE | 202014100458 | 3/2014 |

(Continued)

*Primary Examiner* — Stephen F. Gerrity
(74) *Attorney, Agent, or Firm* — Laurence A. Greenberg; Werner H. Stemer; Ralph E. Locher

(57) ABSTRACT

A beverage bottle and container handling arrangement for handling beverage bottles, cans, or similar containers, and a method of operating a beverage bottle and container handling arrangement, and an adjustment arrangement configured to adjust components of the beverage bottle and container handling arrangement and a method therefor.

19 Claims, 7 Drawing Sheets

(56) References Cited

U.S. PATENT DOCUMENTS

2010/0193331 A1* 8/2010 McAllister et al. . B65G 47/846
  198/478.1
2016/0347556 A1* 12/2016 Fahldieck et al. ... B65G 47/846

FOREIGN PATENT DOCUMENTS

| EP | 2138432 | | | 12/2009 | |
|----|---------|---|---|---------|---|
| EP | 2383081 | | | 11/2011 | |
| JP | 01220634 | A | * | 9/1989 | |
| JP | 05000724 | A | * | 1/1993 | |
| WO | WO-2007031239 | A1 | * | 3/2007 | ........... B65G 47/848 |
| WO | 2014044351 | | | 3/2014 | |
| WO | WO-2014043768 | A1 | * | 3/2014 | ............... B67C 3/24 |
| WO | 2018228727 | | | 12/2018 | |
| WO | WO-2020207665 | A1 | * | 10/2020 | ............. B65G 29/00 |

* cited by examiner

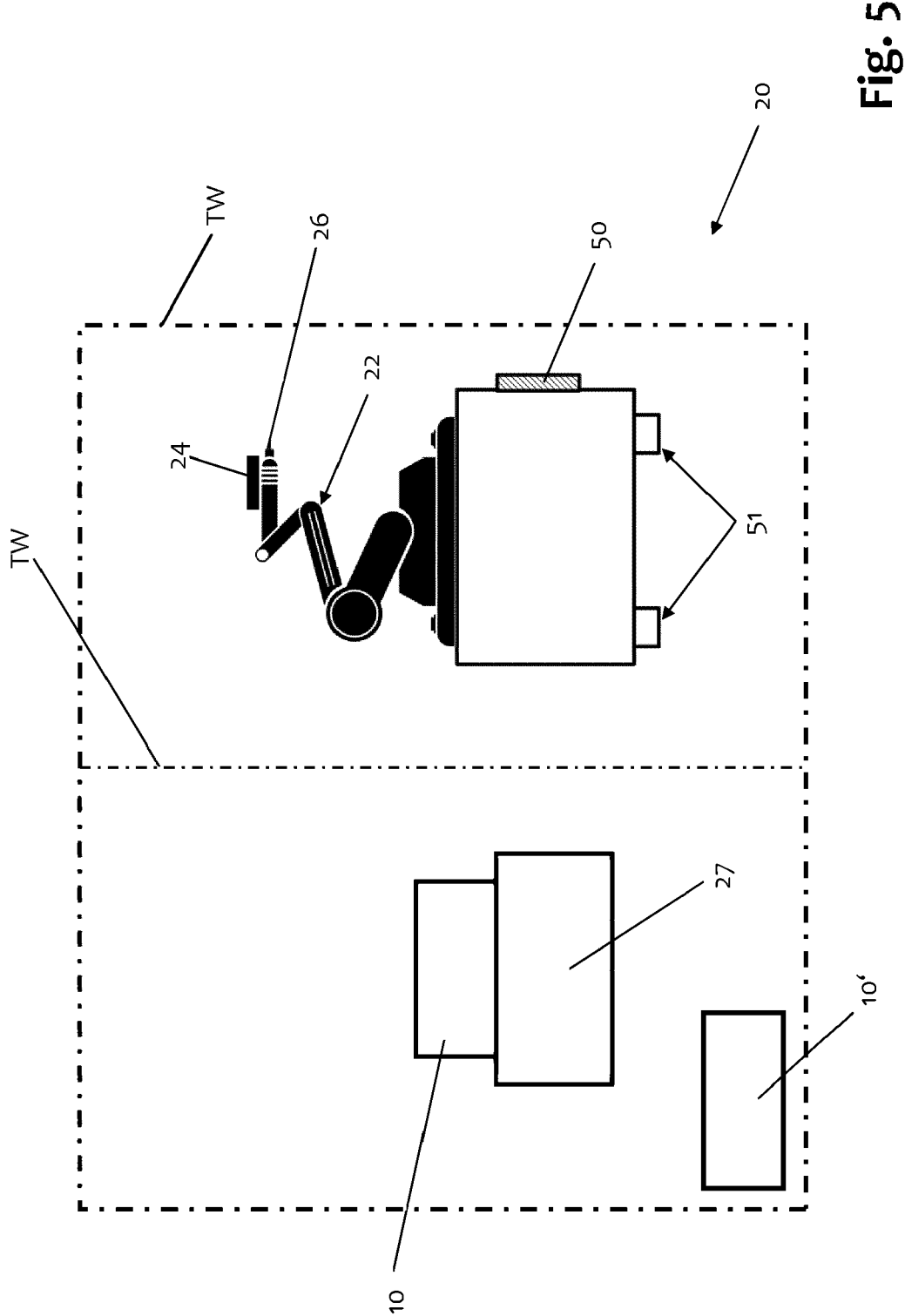

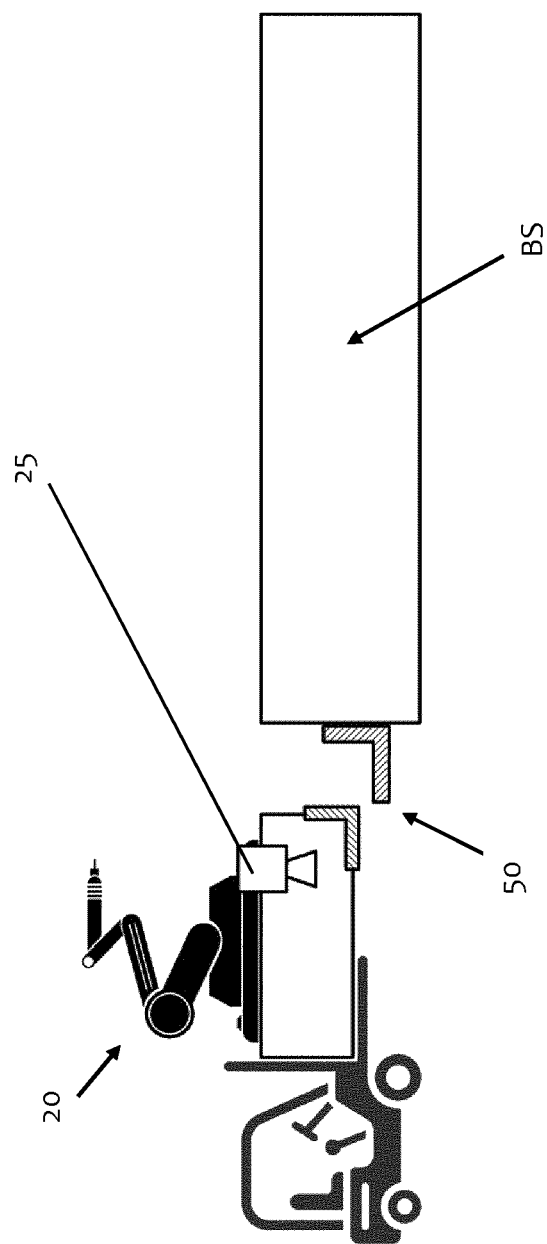

BEVERAGE BOTTLE AND CONTAINER HANDLING ARRANGEMENT FOR HANDLING BEVERAGE BOTTLES, CANS, OR SIMILAR CONTAINERS, AND A METHOD OF OPERATING A BEVERAGE BOTTLE AND CONTAINER HANDLING ARRANGEMENT

CROSS-REFERENCE TO RELATED APPLICATIONS

The present application is a Continuation-in-Part of International Patent Application No. PCT/EP2020/055507, filed Mar. 3, 2020, which claims the benefit of Federal Republic of Germany Patent Application No. DE102019109446.1, filed Apr. 10, 2019, each of which is incorporated by reference herein in its entirety.

BACKGROUND INFORMATION

1. Technical Field

The present application relates to a beverage bottle and container handling arrangement for handling beverage bottles, cans, or similar containers, and a method of operating a beverage bottle and container handling arrangement. The present application further relates to an adjustment arrangement configured to adjust components of the beverage bottle and container handling arrangement and a method therefor.

2. Background Art

This section is for informational purposes only and does not necessarily admit that any publications discussed or referred to herein, if any, are prior art.

In the beverage bottling or container filling industry, container manufacturing machines, such as, for example, filling machines, labeling machines, printing machines, inspection machines, packers, and/or palleting machines, are used to manufacture a variety of containers, such as bottles, cans, or similar containers. The containers can be made of different materials, such as glass, plastic, or metal, and can be made in a variety of shapes, sizes, and dimensions. The containers are generally used for containing consumer products, such as beverages, household supplies, and health and beauty products, usually in the form of liquids, mixtures, or other pourable products. Container handling arrangements are used to move the bottles or containers through or between the container manufacturing machines.

The container handling arrangements comprise container handling components configured to hold and/or guide the containers as the containers are moved through and between the container manufacturing machines. In this situation, for the handling of containers, for example for filling or labeling, the containers are conveyed by the container handling components through the container manufacturing machines from one station to the next. Such container handling components can be, for example, star pockets of a transporter configured as a transport star, guide rails with container-specific widths, or also drive worm units, which are in engagement and/or contact with the containers.

Apart from known adjustable holding and guide elements, the majority of the known container handling components need to be adjusted to the respective characteristics of the containers, such as the container shape/circumference, the container weight and/or the container size, i.e., the overall container geometry, in order to ensure or promote a precise guiding of the containers.

In order for the container handling arrangement to be capable of being used for different containers, the container handling components are oriented and adjusted to the different container geometries, such as the container height and the container diameter. For example, for reliable guiding, the contact point of the container handling component on a container with lesser diameter and/or height, in relation to its position in the container handling arrangement, is perceptibly wider and/or lower than with a container which in comparison is wider in the body or higher.

For this reason, the container handling components are arranged so as be exchangeable in the container handling arrangement, such that, at an adjustment of the container handling arrangement from a first container geometry to a second container geometry, the container handling components can be exchanged. Usually a plurality of container handling component sets are kept in stock for different container geometries. In other words, each of the container handling components has a specific design or format that corresponds to a portion of a container having specific dimensions, wherein different container handling components can have different designs or formats that correspond to containers having different dimensions. The container handling components are removable and exchangeable in order to permit a single container manufacturing machine to handle at least two different containers having different dimensions. For example, if the manufacturer, after manufacturing a first group of containers using a container manufacturing machine, to manufacture a second group of containers, which differ from the first group of containers in size, shape, and/or dimensions, using the same container manufacturing machine, the manufacturer can remove a first container handling component corresponding to the first group of containers and exchange it with a second container handling component corresponding to the second group of containers.

As well as the cost-intensive holding in preparation of different container handling components for the different container geometries, or group of container sizes or container designs, in particular the precise fitting of the container handling components to the dimensions of the portion of the container to be handled is elaborate and cost-intensive, since the container handling components usually cannot be adapted for this purpose at the location at which the container handling arrangement has been set up, but instead must be sent to the place of manufacture of the container handling arrangement in order to be adapted there.

In very many cases, however, the place at which the system is set up or the production location and the place of manufacture of such a container handling arrangement are located far apart from each other, not rarely several hundred, if not even thousands of kilometers away. Added to these difficulties is the fact that in the prior art the container handling components are manufactured on the basis of drawings provided by the client of the container geometry, or alternatively on the basis of sample containers, and specifically at the place of manufacture of the container handling arrangement as a whole.

It is often the case, however, that the container geometry of the sample container provided by the client differs substantially from the container geometry of the containers which are then in fact to be processed by the container handling arrangement at the production location.

This requires the subsequent adjustment of the container handling components of the container handling arrangement. For this purpose, the container handling components which are to be adjusted are then again sent from the place at which the container handling arrangement is set up, or the production location, back to the place of manufacture, in order to be readjusted there and adapted to the dimensions of the portion of the container to be handled. Following this, the container handling components, which have then been readjusted and adapted to the dimensions of the portion of the container to be handled then need to be sent back again to the place at which the container handling arrangement is set up, or the production location. This procedure delays the taking into service of the container handling arrangement as a whole. In addition, the adjustment of the container handling arrangement which has already been set up for a particular container geometry to a container geometry which differs in comparison with this makes this procedure time-consuming and expensive.

In other words, container handling components are made to handle portions of a container having specific dimensions, which include size and shape. The container handling components can be made to handle common containers having popular or relatively standard dimensions, or can be custom made to handle containers having specific dimensions in accordance with the instructions of the customer. The container handling components are manufactured with relatively high precision since modern container handling machines operate at high rates of speed in order to process anywhere from 70,000 to 100,000 containers per hour. Consequently, inaccuracies in the container handling components can result in improper handling of the containers, which can lead to damage of products and costly interruptions in manufacturing, especially if the container handling components are generally inaccessible and/or difficult to remove from the container manufacturing machine. Such problems usually occur if the container handling component has a manufacturing defect or if the customer mistakenly orders a container handling component of incorrect dimensions. Unfortunately, such problems usually can only be discovered upon installation and use of the container handling component at the location of the customer, and then the solution is to send the container handling component back to the manufacturer for modification or to order a new container handling component, which again can result in costly interruptions in the manufacturing operation. In addition, sometimes customers wish to make relatively minor changes in the design of the containers to be manufactured, and thus would like to make minor changes to the design of the corresponding container handling component. In this situation, usually the only solutions are to order a new container handling component or send the container handling component back to the manufacturer for modification, either of which may be quite expensive and again could result in significant and expensive interruptions in manufacturing operations.

BRIEF SUMMARY

In view of the above, an object of at least one possible exemplary embodiment of the present application is to provide a container handling arrangement for the handling of containers, such as beverage bottles, cans, or similar containers, wherein the container handling components can be adapted easily and in a time-saving manner to the dimensions of the portion of the container to be handled of the containers to be handled by the container handling arrangement, as well as a method of adapting the container handling arrangement. These objects can be achieved by a container handling arrangement for the handling of containers or the like, as well as a method of adapting the container handling arrangement, according to at least one possible exemplary embodiment disclosed herein.

At least one possible exemplary embodiment relates to a container handling arrangement for the handling of containers or the like wherein, along a container handling path, at least one container handling component, adjusted or adapted at least partially to correspond to the dimensions of a container to be handled, is provided with a given container handling component geometry, and which is arranged on the container handling arrangement in a detachable manner.

According to at least one possible exemplary embodiment, provision is made for the container manufacturing machine to comprise at least one processing device for adapting the actual container handling component geometry of the at least one container handling component of the container handling arrangement to a proposed container handling component geometry. Accordingly, the actual container handling component geometry can be adapted on the spot, i.e., at the place at which the container handling arrangement is set up or the production location, to the proposed container handling component geometry corresponding to the dimensions of the portion of the container to be handled, without the container handling components thereby needing to be sent back to the place of manufacture of the container handling arrangement. This saves the time delay for the taking into service of the container handling arrangement, but also, if an adaptation to another container geometry is required, it saves the time delay for the sending of the container handling components for the adaptation, and gives the system manufacturer flexibility, during the installation of the system, in the configuration of the container handling arrangement to different container geometries. By adjusting the actual geometry of the at least one container handling component of the container handling arrangement to a proposed container handling component geometry corresponding to the dimensions of the portion of the container to be handled, directly at the place at which the container handling arrangement is set up, or the production location, an extremely short realization time is achieved, that is, a short time to market.

In other words, the container handling arrangement comprises container handling components, that is, components that make contact with and move the containers along a container handling path or travel route. The container handling components usually have multiple container handling sections, and each of these sections is designed to handle a portion of a container having certain dimensions. When manufacturing such container handling components, the handling sections are formed to have a proposed or intended geometry or configuration in accordance with a design specification corresponding to the type of container to be handled. However, the actual geometry or configuration of one or more of the container handling sections after manufacture may have to be modified or adapted for one of a few reasons. First, due a manufacturing defect or error, the actual geometry of one or more of the container handling sections does not match, within reasonable manufacturing tolerances, the proposed geometry for the type of container to be handled. Second, the actual geometry of the container handling sections is in accordance with the proposed geometry, but the proposed geometry requested by the customer or used by the manufacturer does not correspond to or is not suitable for the type of container to be handled. Third, the actual geometry of the container handling sections is suitable for the type of containers being handled by the container handling arrangement, but the customer wishes to handle a different type of container, and therefore the container handling sections require adaptation or modification to a different proposed geometry that corresponds to the type of container to be handled. Regardless of the reason, in accordance with at least one possible exemplary embodiment, the actual geometry of one or more container handling sections of the container handling component can be adapted or modified to match, within reasonable manufacturing tolerances, a proposed geometry that is suitable for handling the type of container to be handled by the container handling component. The adaptation or modification can be performed at the location of the customer, possibly without having to remove the container handling component out of the container handling arrangement. For example, in the case of a star wheel with a plurality of pockets designed to receive and hold the neck of a container, each pocket should be essentially the same dimensions. If one of the pockets has been manufactured with an error or defect, such that, for example, the pocket is too wide or too narrow, then the pocket will not hold a container in a suitable manner. Either the container will not fit into the narrow pocket, or the container will not be held securely in the wide pocket. Therefore, instead of having to order a completely new container handling component, or having to send the container handling component back to the manufacturer for modification, the container handling component can be adapted or modified on the spot, thereby saving time and expense. The same modifications can be made in the event the star wheel has the wrong-sized pockets, either because the customer ordered the wrong size or the customer wants to change to a different size. Regardless of the reason, the adaptation can be done locally and relatively quickly and easily to minimize interruptions in operation of the container manufacturing machine and reduce costs.

In this situation, provision can be made for the at least one processing device to be arranged on the container handling path of the container handling arrangement, by use of at least one interface, in such a way that it is secure but detachable. As a result, it is ensured that the processing device can be put into use at different points along the container handling path.

According to at least one possible exemplary embodiment, provision can be made in this situation that the processing device is configured so as to be movable by use of a drive unit, which contributes to the further simplified preparation of the processing device precisely at the different locations and handling positions along the container handling path.

According to at least one possible exemplary embodiment, provision can be made in this situation that the processing device is configured for the adjustment of the actual container handling component geometry to a proposed container handling component geometry corresponding to the dimensions of the portion of the container to be handled, in the installed and/or non-installed state of the corresponding container handling component of the container handling arrangement which is to be processed. This allows for a time-saving adaptation of the container handling components directly in or at the container handling arrangement.

According to at least one possible exemplary embodiment, provision can be made in this situation that, for the adaptation of the actual container handling component geometry to the proposed container handling component geometry corresponding to the dimensions of the portion of the container to be handled, the processing device comprises at least one processing tool arranged at a guide and movement device, for the mechanical and/or welding processing of at least one container handling component geometry section of the corresponding container handling component. Accordingly, the container handling component can be processed as required in the at least one container handling component geometry section deviating from the actual container handling component geometry, and does not need to be subjected to complete processing. Moreover, the arrangement of the processing tool at the guide and movement device allows for increased flexibility of the processing. In order to allow for processing which can be individually controlled and is adapted to the respective container handling component, provision is made for the guide and movement device to be configured as a robot kinematics unit exhibiting several axes of rotation and/or movement, which comprises several robot arms, which in each case are connected to one another such as to be capable in each case of rotating or pivoting about an axis of rotation.

According to at least one possible exemplary embodiment, provision can be made in this situation that the at least one processing tool is configured for the processing of the at least one container handling component geometry section by use of material removing and/or grinding and/or build-up welding and/or water-jet based processing. This therefore allows for the most widely differing container handling component geometry sections to be processed such as may be required.

According to at least one possible exemplary embodiment, provision can be made in this situation that the at least one processing tool is arranged at the guide and movement device by use of an exchanging device. This allows for the processing tool to be guided and operated in a controlled manner by use of the guide and movement device.

According to at least one possible exemplary embodiment, provision can be made in this situation that, in addition, a suction device is provided at the guide and movement device next to the at least one processing tool. According to at least one possible exemplary embodiment, with material-removing processing in the installed state of the container handling component, this allows for the material which is thereby produced to be suctioned away immediately, and therefore does not remain in the container handling arrangement.

According to at least one possible exemplary embodiment, provision can be made in this situation that the container handling arrangement comprises at least one detection device, which is configured in such a way as to optically detect the container handling component geometry section which deviates from the proposed container handling component geometry that corresponds to the dimensions of the container to be handled, and then assign a subsequent processing section. The at least one detection device can be arranged on a carrier and/or on the guide and movement device, and in this situation can be configured as a three-dimensional camera system or as a three-dimensional laser measuring device.

According to at least one possible exemplary embodiment, provision can be made in this situation that the at least one processing device adapts the at least one container handling component, depending on a control and evaluation routine carried out in a control unit, to the proposed container handling component geometry corresponding to the dimensions of the portion of the container to be handled. This allows for an adaptation of the container handling component geometry which is automated by a control unit.

In this situation the control unit is configured in such a way that, depending on the container handling component geometry for the container handling component which is to be processed, corresponding to the dimensions of the portion of the container to be handled, to define a container handling component geometry section, at the at least one container handling component geometry section deviating from the predefined container handling component geometry, a subsequent processing section in respect of its three-dimensional outer contour, and, progressing from this, to produce the control and evaluation routine, wherein subsequently the at least one processing tool can be guided in a controlled manner, by use of the guide and movement device, at least to the subsequent processing section which has been determined, and to adapt the respective format geometry section, assigned to the subsequent processing section, in a specific manner by use of the at least one processing tool, to the proposed container handling component geometry corresponding to the dimensions of the portion of the container to be handled.

According to at least one possible exemplary embodiment, provision can be made in this situation that the guide and movement device comprises a processing device, which in at least one exemplary embodiment can be assigned by use of the exchanging device to the guide and movement device, as a result of which an automated removal of the container handling components from the container handling arrangement can be carried out.

According to at least one possible exemplary embodiment, provision can be made in this situation that the processing device comprises a workpiece carrier for the indexed holding of the container handling components. By way of the indexed securing of the container handling components in the workpiece carrier, a defined processing position is created, which improves the precision of the processing by the processing device.

Finally, according to at least one possible exemplary embodiment, provision can be made that the processing device is separated by use of at least partition wall from the container handling path. As a result, next to the container handling path a separate or protected processing center is provided in the immediate locational proximity to the container handling arrangement, and prevents the handling material from passing into the container handling arrangement.

The term "container" in the meaning of at least one possible exemplary embodiment is understood to be any container, such as bottles, cans, beakers, etc., in each case made of metal, glass, and/or plastic, or possibly PET (polyethylene terephthalate).

The expression "essentially" or "approximately" signifies in the meaning of at least one possible exemplary embodiment deviations from the exact value in each case by +/−10%, or possibly +/−5%, and/or deviations in the form of changes which are not of significance for the function.

Further embodiments, advantages, and possible applications of at least one possible exemplary embodiment are also derived from the following description of exemplary embodiments and from the figures. In this situation, all the features described and/or represented in the figures, individually or in any desired combination, are in principle the object of the invention, regardless of their combination in the claims or reference to them. The content of the claims is also made a constituent part of the description.

At least one possible exemplary embodiment is explained in greater detail hereinafter on the basis of the figures, in relation to exemplary embodiments.

BRIEF DESCRIPTION OF THE DRAWINGS

FIG. 5 shows a schematic view from above of the container handling component processing device in accordance with at least one possible exemplary embodiment;

FIG. 6b shows the container handling component processing device in a schematic side view in accordance with at least one possible exemplary embodiment.

DETAILED DESCRIPTION

Identical reference numbers are used in the figures for the elements of at least one possible exemplary embodiment which are the same or have the same effect. Moreover, for the sake of easier overview, only reference numbers are represented in the individual figures which are required for the description of the respective figure and/or for components or portions not already referenced in other figures.

Figure 1:
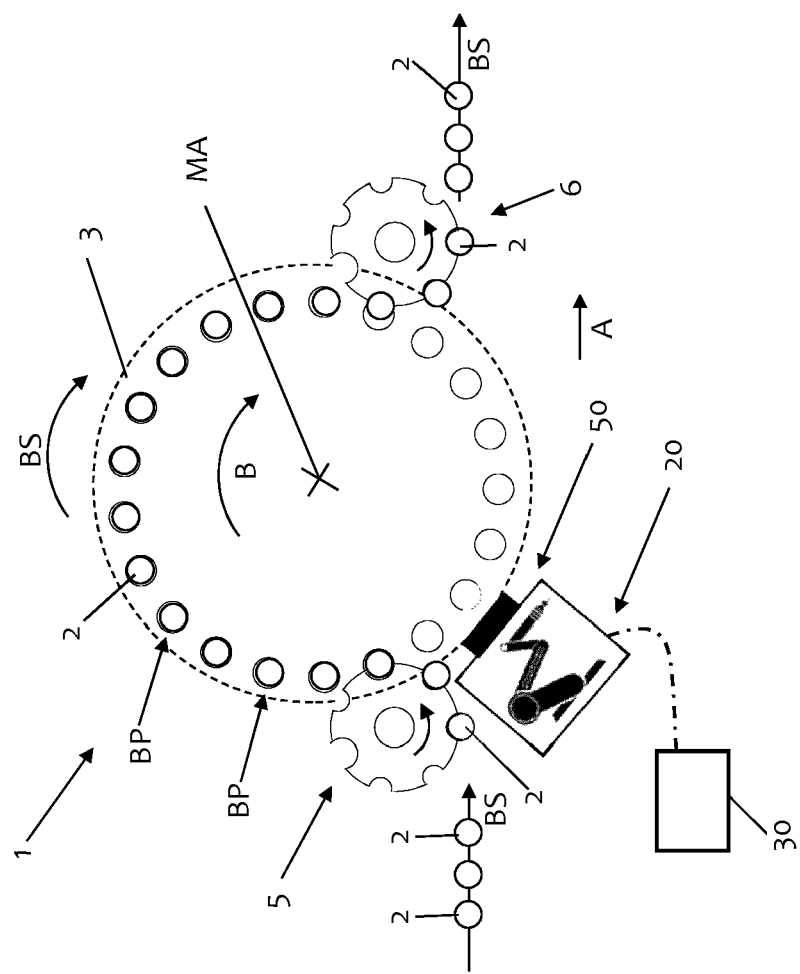
FIG. 1 shows, in a view from above, a container manufacturing machine for the manufacture of containers or the like, in accordance with at least one possible exemplary embodiment.

The container manufacturing machine 1 in FIG. 1 is configured in this situation for the manufacture, handling, and/or processing of containers 2 or the like. In greater detail, the container manufacturing machine 1 can comprise a container handling arrangement 3, which is configured as a filling machine, labeling machine, inspection machine, or rinser for the handling of containers, such as, for example, bottles or cans.

By way of example, the container handling arrangement 3 of the container manufacturing machine 1 in FIG. 1 is configured as a filling machine, such as a filling machine for the filling of containers 2 with a liquid filling material along a container handling path BS, generally running in a transport direction A. The container handling path BS is the path of travel of a container 2 as it is moved into, through, and out of the container manufacturing machine 1.

The container handling arrangement 3 can be configured as such with a circulating configuration with a rotor, which during the filling operation is driven such as to rotate about a vertical machine axis MA. The container handling arrangement comprises a plurality of handling positions BP positioned about the perimeter or circumference of the rotor, to which the containers 2 which are to be filled are conveyed by a first transporter 5, configured as a container inlet, and from which the processed containers 2, for example filled with a liquid filling product, are removed at a second transporter 6, configured as a container outlet. In this situation, the first transporter 5 can be configured, for example, as an infeed star or inlet star.

According to at least one possible exemplary embodiment, the second transporter 6 of the container manufacturing machine 1, configured as a container outlet, can be formed as an outlet star or star wheel, or, alternatively, also as a linear conveyor, which then takes over the already filled containers 2 and conveys them further along the container handling path BS in the transport direction A. In the angle region of the rotational movement of the rotor between the container inlet 5 and the container outlet 6, as a general rule, the handling of the containers 2 of the container manufacturing machine 1 takes place by use of the container handling arrangement 3.

Figure 2:
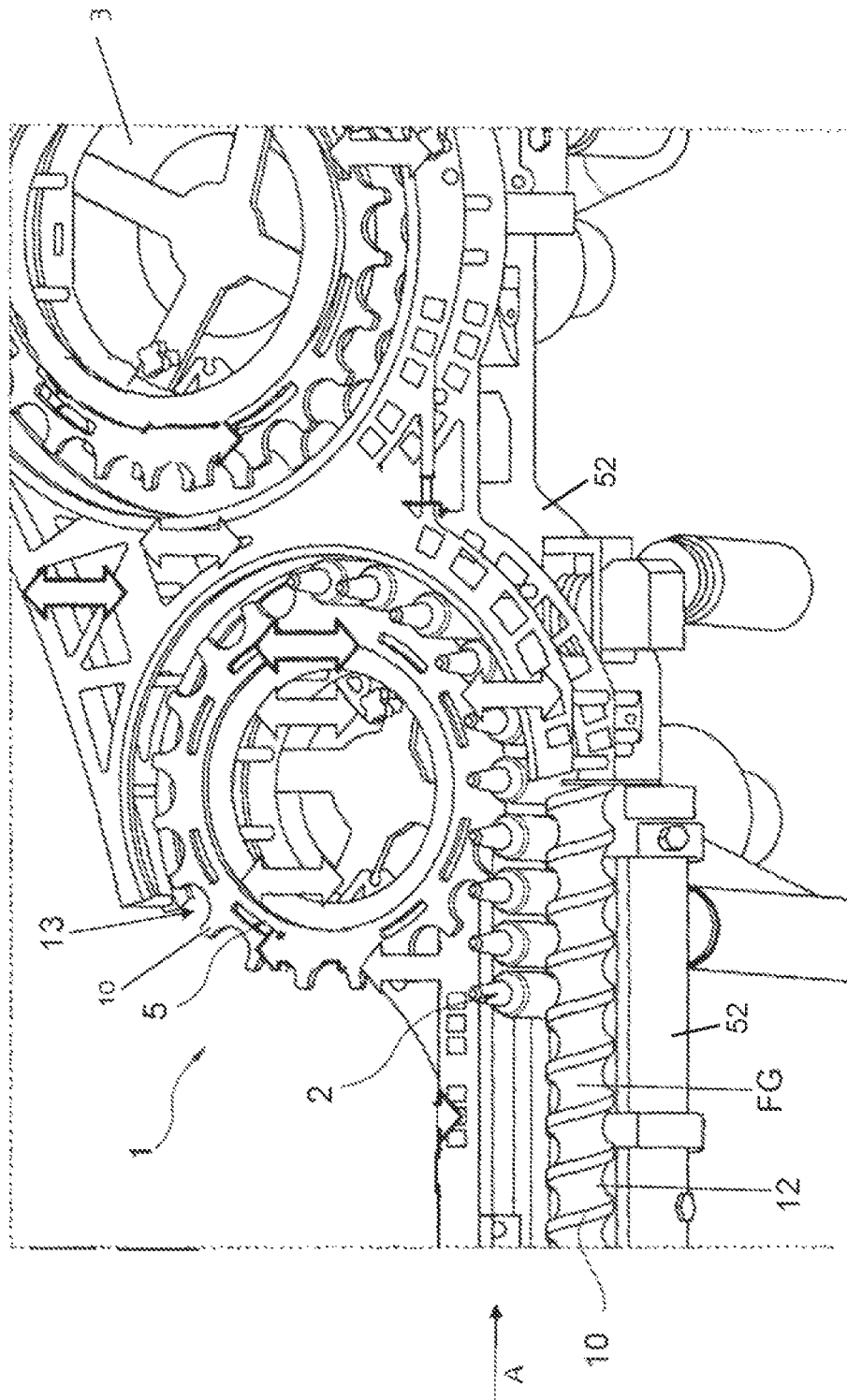
FIG. 2 shows a section of a container handling machine in a perspective view in accordance with at least one possible exemplary embodiment.

In this situation, FIG. 2 shows a section of the container manufacturing machine 1 in a perspective view, in which, by way of example, several container handling components 10 with different actual container handling component geometries FG are represented. In greater detail, by way of example, in this situation the region of the first transporter 5 is shown, as well as the container handling arrangement 3, configured as a filling machine, from FIG. 1. In this situation, the container manufacturing machine 1 comprises, for the conveying of the containers 2 to the first transporter 5 configured as a container inlet, a worm or screw conveyor 12, of which the thread-formed worm section forms a container handling component 10 with an actual container handling component geometry FG. If it is intended that a container 2 with, for example, a larger container outer diameter, should be conveyed by use of the worm conveyor 12, then the worm section of the worm conveyor 12, configured as a container handling component 10, must be adapted in its container handling component geometry FG to this container outer diameter, which in comparison is then larger.

Figure 3:
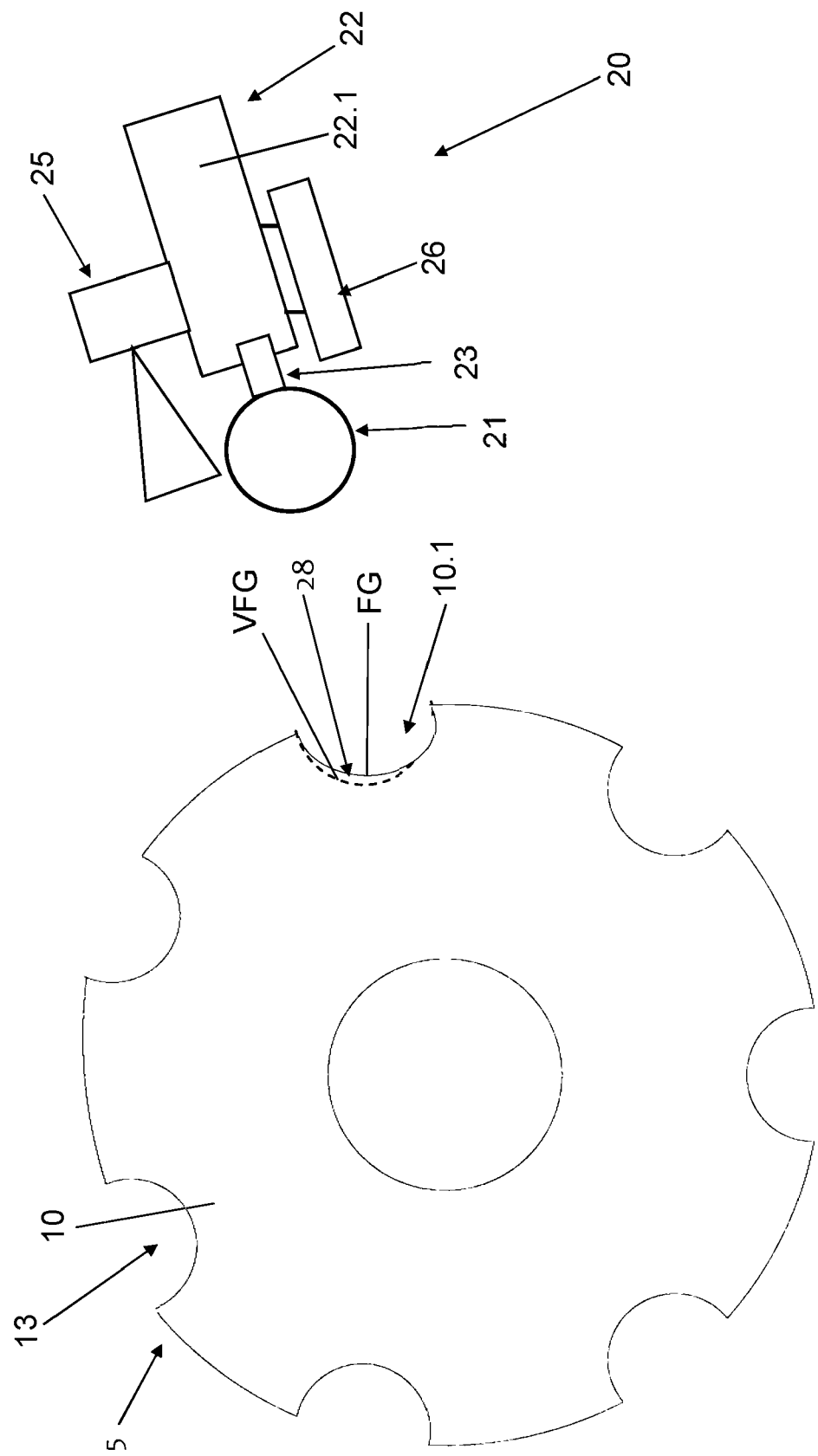
FIG. 3 shows a container handling component in a schematic view from above in accordance with at least one possible exemplary embodiment.

A further container handling component 10, shown by way of example in FIG. 3, is formed by the star pockets 13, provided at the transporter 5 configured as a transport star, in which the containers 2 are received during the transport at least partially by their container outer circumference. The container handling component 10, formed as a transport pocket 13, also exhibits an actual container handling component geometry FG. In this situation, the container handling components 10 can be provided as exchangeable for the purpose of a container handling component change, i.e., are provided secured but in a detachable manner on the container manufacturing machine 1.

A container handling component 10 therefore is any component or part or structure that holds or guides a container 2 during transport, and specifically comprises a part or portion or section 10.1 that has a geometry designed or configured to follow or match or correspond to the portion of a container that the container handling component section 10.1 is intended or proposed to handle. For example, in the case of handling beverage bottles having cylindrical body portions and tapered neck portions, one container handling component section 10.1 is designed to correspond to the larger body portions, whereas another container handling component section 10.1 is designed differently to correspond to the smaller neck portions. Such container handling components 10 can include threaded screw feeders or worm conveyors 12, star wheels or transport stars having container pockets 13, or rotors or carousels having container receptacles for holding portions of a container 2.

The container handling components 10 of the container manufacturing machine 1 in this situation first exhibit, at the place of installation or production, after the fitting of the container manufacturing machine 1 with the container handling components 10 manufactured at the place of manufacture, an actual container handling component geometry FG, which are manufactured in accordance with the container geometries notified by the client, and which in this case at least partially do not correspond with the actual container geometries of the containers 2 which are to be processed at the place of installation or production.

In other words, the actual container handling component geometry FG, after the fitting of the container manufacturing machine 1 with at least one container handling component 10, does not correspond in at least one container handling component geometry section 10.1 with the intended or proposed container handling component geometry VFG corresponding to the dimensions of the portion of the container to be handled.

To further explain, the intended or proposed container handling component geometry VFG is essentially the ideal geometry that matches or follows the proposed design specifications used in manufacturing the container handling component 10, whereas the actual container handling component geometry FG is the geometry of the container handling component 10 as actually manufactured. The objective when manufacturing the container handling component 10 is to make a container handling component 10 for which the actual container handling component geometry FG is the same or essentially the same as the proposed container handling component geometry VFG, within reasonable manufacturing tolerances. In accordance with at least one possible exemplary embodiment, any actual container handling component geometry FG can be adjusted or adapted to a proposed container handling component geometry VFG, whether to correct an error or defect or to alter the use or operating parameters of the container handling component 10.

By way of example, the at least one container handling component geometry section 10.1 of the container handling component 10, which deviates in its actual container handling component geometry FG from the proposed container handling component geometry VFG, can be formed in the region of the star pockets 13 of the transporter 5 or in the thread section of the worm conveyor 12.

Represented in FIG. 3, by way of example, is a star pocket 13, taken for illustrative purposes. In this situation, the unbroken black line in the star pocket 13 forms the actual outer contour, as the actual container handling component geometry FG, while the broken line represents the proposed container handling component geometry VFG of the container handling component geometry section 10.1, corresponding to the dimensions of the portion of the container to be handled.

It is also possible for several container handling component geometry sections 10.1 to be formed on a container handling component 10, which deviate in their actual container handling component geometry FG from the proposed container handling component geometry VFG corresponding to the dimensions of the portion of the container to be handled.

According to at least one possible exemplary embodiment, the container system 1 comprises at least one processing device 20 for adapting the actual container handling component geometry FG of the at least one container handling component 10 of the container manufacturing machine 1 to a container handling component geometry VFG corresponding to the dimensions of the portion of the container to be handled. In other words, the actual container handling component geometry FG can therefore be adapted, by use of the at least one processing device 20, to an intended container handling component geometry VFG corresponding to the dimensions of the portion of the container to be handled.

In this situation, provision can be made for the adaptation of the actual container handling component geometry FG of the at least one container handling component 10 to the container handling component geometry VFG, corresponding to the dimensions of the portion of the container to be handled, to be carried out by use of the processing device 20 in the incorporated, i.e., fitted, state of the container handling component 10 in the container manufacturing machine 1, in which case it is not necessary for the container handling component 10 to be removed from the container manufacturing machine 1.

Figure 6A:
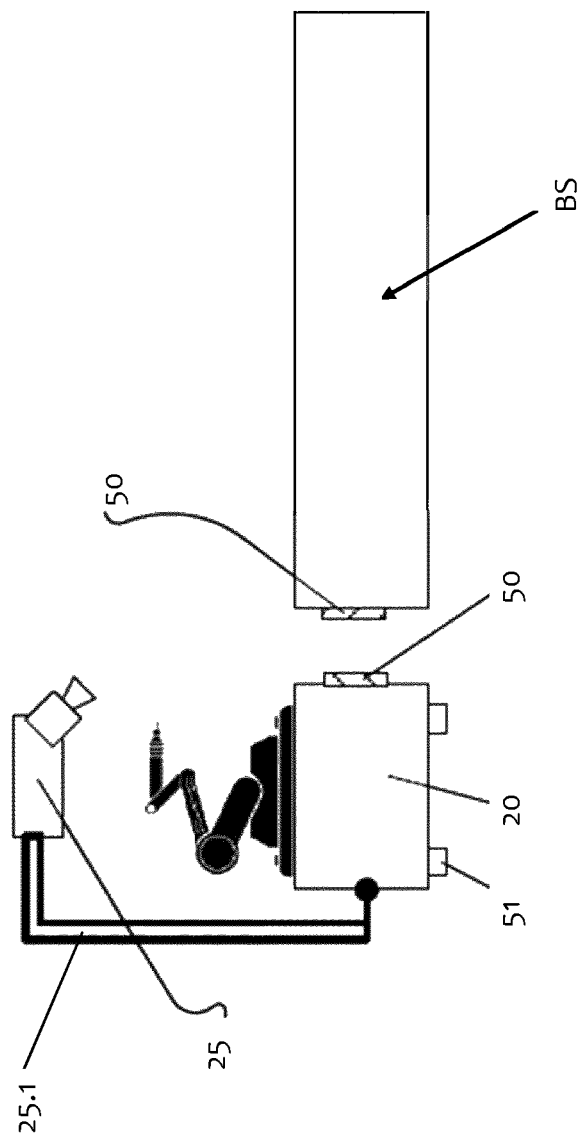
FIG. 6a shows the container handling component processing device in a schematic side view in accordance with at least one possible exemplary embodiment.

In this situation, again, the processing device 20 can be arranged on or adjacent the container manufacturing machine 1 by use of an interface or connecting arrangement 50, such as an interface element or flange, represented schematically in FIGS. 6a and 6b, or can be coupled to it in a fixed position. The interface 50, as shown in FIG. 6b, can also be configured for the carrying and fixed-position holding of the processing device 20. In accordance with one exemplary embodiment, by use of the interface 50, the processing device 20 can be arranged on the container manufacturing machine 1 in a detachably fixed manner.

It is also possible in this situation for several interfaces 50 to be provided along the container handling path BS, such that the processing device 20 can be put into effect in accordance with the requirement at different interfaces 50 along the container handling path BS.

In this situation it can be advantageous for the processing device 20 to comprise an independent drive unit 51, such as a roller drive, for moving the processing device 20 on the plane of a floor (see FIG. 6b). This allows for simple engagement of the processing device 20 as required at different interfaces 50 along the container handling arrangement BS.

The processing device 20 comprises, in this situation, at least one processing tool 21 for the mechanical and/or welding processing of the geometry of at least one of the container handling component sections 10.1 for the purpose of adaptation to a proposed container handling component geometry VFG, corresponding to the dimensions of the portion of the container to be handled, this tool being arranged and guided at a guide and movement device 22. Mechanical and/or welding processing in the context of the present application is understood to mean both a removal of material as well as a build-up of material, i.e., an addition of material, on the at least one container handling component section 10.1.

The guide and movement device 22 can be configured as a robot kinematics unit exhibiting several axes of rotation 22.2 and/or movement, which comprises several robot arms 22.1, which in each case are connected to one another such as to be capable in each case of rotating or pivoting about an axis of rotation 22.2.

The at least one processing tool 21 can in this case be configured, for example, for the material removing and/or grinding and/or build-up welding and/or water-jet based processing of the at least one container handling component section 10.1 of the corresponding container handling component 10. In at least one exemplary embodiment, the at least one processing tool 21 can be arranged at the guide and movement device 22 by use of an exchange device 23, indicated only schematically, which is configured, for example, as a quick-action coupling system. By use of the exchange device 23, a simple exchange between different processing tools 21 is possible at the guide and movement device 22.

Provision can also be made for several processing tools 21 to be arranged at the guide and movement device 22, such as, for example, a mechanical processing tool and a welding tool.

In this situation, in addition, a suction device can be provided at the guide and movement device 22, next to the at least one processing tool 21, in order to suction away processing material which is incurred, generated, or removed during processing.

In this situation, the at least one processing tool 21, arranged at the guide and movement device 22, can be moved and actuated in a controlled manner by use of the guide and movement device 22, and specifically dependent on a control and evaluation routine SAR carried out in a control unit 30.

By the specifically controlled guiding of the at least one processing tool 21, dependent on the control and evaluation routine SAR carried out in the control unit 30, the processing tool 21 can be moved to the at least one container handling component section 10.1 of the container handling component 10 which is to be processed, and this at least one container handling component section 10.1 can be adapted, i.e., processed, to a proposed container handling component geometry VFG, corresponding to the dimensions of the portion of the container to be handled.

In greater detail, for this purpose, dependent on the proposed container handling component geometry VFG corresponding to the dimensions of the portion of the container to be handled, at least one subsequent processing section 28 is defined for the container handling component 10 which is to be processed, at the at least one container handling component section 10.1 deviating from the predefined container handling component geometry VFG, on its three-dimensional outer contour, and, starting from this, the control and evaluation routine SAR is produced, wherein, following this, the at least one processing tool 21 is guided in a controlled manner by use of the guide and movement device 22, at least to the subsequent processing section 28 which has been determined, and the respective container handling component section 10.1 assigned to the subsequent processing section 28 is then specifically adapted by use of the at least one processing tool 21 to the container handling component geometry VFG corresponding to the dimensions of the portion of the container to be handled.

The dimensions of the portion of the container to be handled can be detected, for example, by use of a detection device 25, and in this situation can be deposited as a reference processing data set SBD for the container handling component geometry VFG corresponding to the dimensions of the portion of the container to be handled, in the control unit 10 for the control and evaluation routine SAR. In awareness of the proposed container handling component geometry VFG, i.e., in awareness of the dimensions of the portion of the container to be handled, a subsequent processing section 28 is assigned, for example, to the container handling component section 10.1, which deviates in its actual container handling component geometry FG from the actual container handling component geometry VFG.

In addition to the at least one processing tool 21, it is also possible in this situation for a detection device 25 to be arranged by use of the exchange device 23 in an exchangeable manner at the guide and movement device 22. The detection device 25 can in this situation also be configured for the detection of the dimensions of the portion of the container to be handled, and therefore for the preparation of the reference processing data set SBD.

As is indicated schematically in FIG. 5a, the detection device 25 can also be connected in a fixed position to the processing device 20 by use of a carrier 25.1.

By use of the detection device 25, the at least one container handling component section 10.1, which deviates from the dimensions of the portion of the container to be handled in the actual container handling component geometry FG, can be optically detected, and a subsequent processing section 28 can then be assigned to it. For the optical detection of the actual container handling component geometry FG of the container handling components 10, in at least one exemplary embodiment, the detection device 25 is carried with them in a controlled manner by use of the guide and movement device 22.

For the controlled guidance of the guide and movement device 22 and/or the optical determination and detection of the at least one subsequent processing section 28, the detection device 25 and/or the guide and movement device 22 is connected to the control unit 30, in which a control and evaluation routine SAR is carried out. The control and evaluation routine SAR is configured, in addition to the controlling of the detection device 25, also for the controlling of the guide and movement device 22 as well as of the at least one processing tool 21.

In accordance with at least one exemplary embodiment, in this situation both the detection device 25 as well as the at least one processing tool 21 can be arranged at the guide and movement device 22, and specifically in such a way that, before and/or after the optical detection of the actual container handling component geometry FG and determination of the respective subsequent processing section 28, a processing of this subsequent processing section 28 takes place by use of the at least one processing tool 21, and can be switched between the functional performances of the detection device 25 and/or the at least one processing tool 21.

The detection device 25 is configured, in at least one exemplary embodiment, to acquire at least one image record of the container handling component section 10.1, deviating in the actual container handling component geometry FG from the dimensions of the portion of the container to be handled, and, by use of an image processing unit, assigning a subsequent processing section 28, as well as the container handling component section 10.1, as the actual container handling component geometry FG and/or the dimensions of the portion of the container to be handled as the proposed or intended container handling component geometry VFG.

In at least one exemplary embodiment, the detection device 25 can be configured in this situation as a three-dimensional camera system with a resolution of up to five micrometers or as a three-dimensional laser measurement, which is arranged such as to produce a three-dimensional image record of the at least one subsequent processing section 28 and/or the dimensions of the portion of the container to be handled. Accordingly, by use of the detection device 25, it is possible for the container handling component section 10.1 of the container handling component 10 deviating from the actual container handling component geometry VFG to be detected and measured.

In other words, the container handling component section 10.1 to be adapted or processed by the processing tool 21 can be analyzed to determine its actual geometry FG. The container handling component section 10.1 is first detected by the detection device 25. The data regarding the geometry of the container handling component section 10.1, such as image data, is then sent to the control unit 30 for analysis. The control unit 30 compares the measured or actual geometry FG of the container handling component section 10.1 against the proposed or intended geometry VFG. By comparing the actual geometry FG against the proposed geometry VFG, the differences in geometry or dimensions between the actual geometry FG and the proposed geometry VFG can be determined. Based on the measured differences, the control unit 30 operates the processing unit 21 to perform an adjustment or adaptation of the container handling component section 10.1, wherein the actual geometry FG is adjusted or adapted to the proposed geometry VFG. The end goal of the adjustment procedure is that the adjusted actual geometry FG of the container handling component section 10.1 matches or essentially matches, within reasonable manufacturing tolerances, the proposed geometry VFG.

Figure 4:
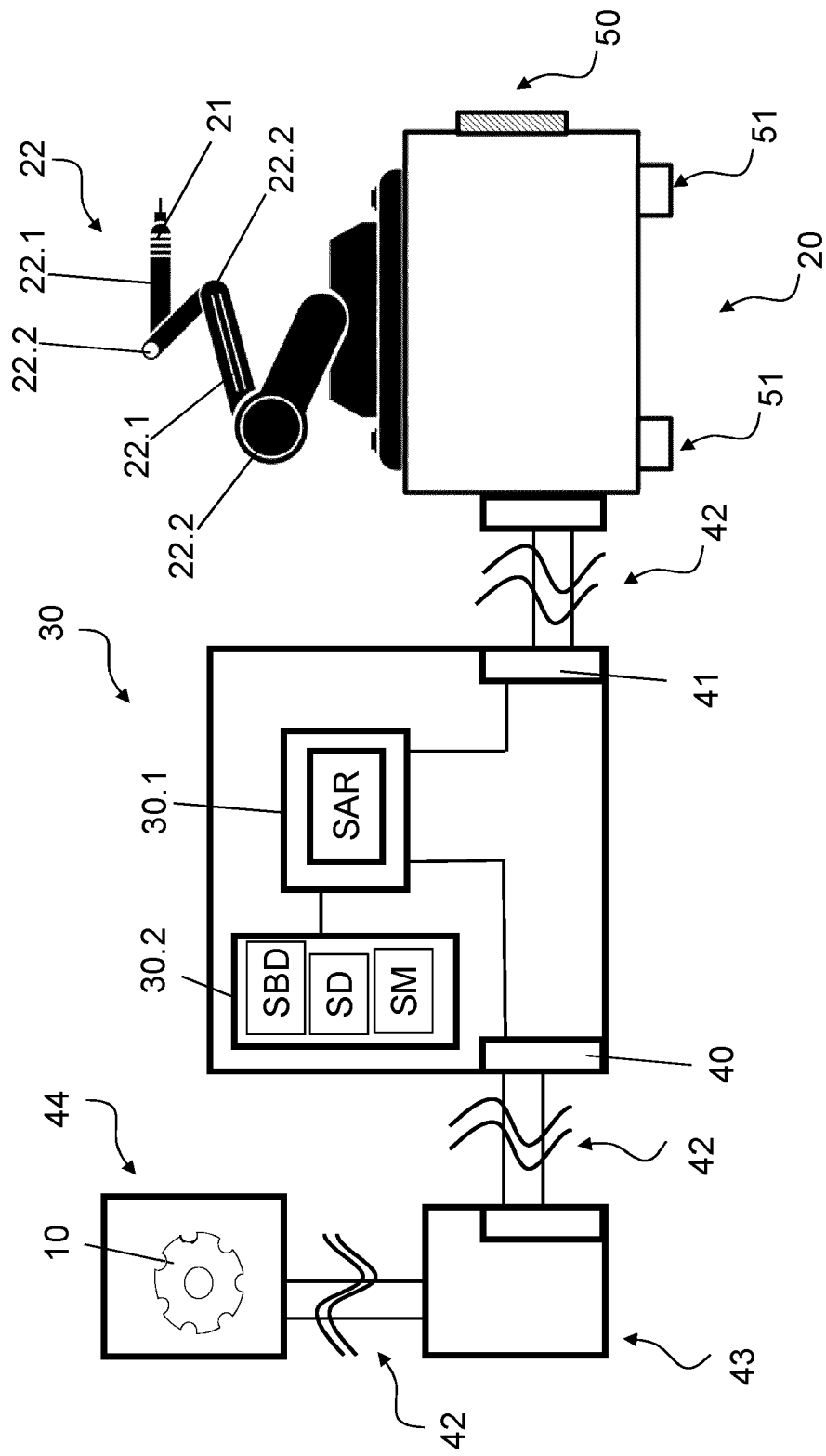
FIG. 4 shows a schematic block diagram of a container handling component processing device in accordance with at least one possible exemplary embodiment.

FIG. 4 shows a schematic block circuit diagram of the control unit 30, in which the control and evaluation routine SAR is carried out. For this purpose the control unit 30 comprises at least one processor unit 30.1 for carrying out the control and evaluation routine SAR, a memory unit 30.2 interacting with the processor unit 30.1 for the storing, at least at specific points of time, of process parameters and/or control data, as well as a first and second interface 40, 41. The processor unit 30.1 is, in this situation, configured so as to convert the dimensions of the portion of the container to be handled received at the first interface 40 of the control unit 30, by use of the control and evaluation routine SAR, into control and processing data SD, or to define control commands which can be transferred, via the second interface 41, to the guide and movement device 22, in order for this to be moved in a controlled manner, dependent on the control and processing data SD or control commands produced by use of the control and evaluation routine SAR, to a predetermined container handling component section 10.1 of the three-dimensional outer contour of the container handling component 10, and then adapted to the container handling component geometry VFG, corresponding to the dimensions of the portion of the container to be handled, i.e., processed.

It is also possible for already actual control and processing modules SM for the control and evaluation routine SAR to be deposited in the memory unit 30.2. It is also possible for the reference data set SBD to be deposited and/or stored in the memory unit 30.2, as a processing module SM, of a container handling component 10, already adapted beforehand by use of the processing tool 21 to the container handling component geometry VFG corresponding to the dimensions of the portion of the container to be handled. As a result, it is possible in a relatively simple manner for a container handling component 10 which has already been produced beforehand to be produced anew. It is also possible for replacement container handling components to be reproduced easily on the spot. By use of the control and processing modules SM, already predefined processing steps can be assigned to predetermined container handling component sections 10.1 of the three-dimensional outer contour of the container handling component 10, which are then loaded by use of the control and evaluation routine SAR, and can be carried out in the processor unit 30.1. It is also possible, by way of such control and processing modules SM, for the processing steps to be carried out for the different container handling component sections 10.1 to be predefined individually.

In this situation provision can be made for the transfer of the control and processing data SD or the control commands between the second interface 41 and the guide and movement 22 by use of a wireless or wire-bound data transfer path 42. The first interface 40 is in this situation likewise connected, via a data transfer path 42, for transferring the reference data set SBD, to a computer unit 43, for example as a personal computer, laptop, or tablet. The computer unit 43 is in this case configured such as to produce reference data sets SBD, and comprises the program routines required for this purpose.

The computer unit 43 is further connected to a display unit 44, which can be connected to the computer unit 33 or integrated in it. The display unit 44 is configured so as to display three-dimensional graphic objects, such as the three-dimensional outer contour of the container handling components 10, with their container handling component section 10.1 and/or the dimensions of the portion of the container to be handled, on the basis of the detected three-dimensional scan of the container 2. In at least one exemplary embodiment, the reference processing data set SBD can be produced by use of the computer unit 33 in such a way that the software-based subsequent processing section 28 can be assigned to the container handling component section 10.1 of the container handling components 10.

In this situation, the processing device 20 can also be configured so as to process the container handling components 10 next or outside the container handling path BS, in other words, in the removed, i.e., dismantled, state of the corresponding container handling component 10 from the container manufacturing machine 1. For this purpose, the guide and movement device 22 can comprise a holding device 26, for example a gripper device, which, in accordance with one exemplary embodiment, can be assigned by use of the exchange device 23 to the guide and movement device 22.

By use of the holding device 26, assigned to the guide and movement device 22, it is possible in this situation for the corresponding container handling components 10 at the container manufacturing machine 1 to be dismantled, for example taken out, and moved to a tool carrier 27 assigned to one of the processing devices 20. The tool carrier 27 serves in this situation to provide the indexed holding of the container handling components 10 during their processing by use of the at least one processing tool 21.

In this situation, the processing device 20 can also be provided so as to adapt container handling components 10', formed as unfinished container handling components with an actual container handling component geometry FG, to a container handling component geometry VFG corresponding to the dimensions of the portion of the container to be handled. For this purpose, the processing device 20 can, for example, store such unfinished container handling components in the region of the tool carrier 27, and, as required, draw them out for processing. It is possible for a part production to be carried out from unfinished container handling components, which then at least partially correspond in their actual container handling component geometry FG to the proposed container handling component geometry VFG in accordance with the dimensions of the portion of the container to be handled. The processing device 20 forms in this situation a kind of processing center next to the container handling path BS.

Provision can also be made in this situation for the processing device 20 to be separated from the container handling path BS by use of at least one partition wall TW. This can then prevent dirt which occurs during the processing from passing into the container handling path BS.

The invention has been described heretofore on the basis of exemplary embodiments. It is understood that a large number of alterations or deviations are possible without thereby departing from the scope of protection of the invention defined by the claims.

In other words, in accordance with at least one possible exemplary embodiment, a plurality of container handling components 10', formed or manufactured to have an actual geometry FG that generally or partially or roughly follows a proposed geometry VFG. These unfinished container handling components 10' can be stored by the customer at the container handling plant or location for future use. This allows the customer to order and have on hand a supply of unfinished container handling components 10' that can be customized in the future in the event the customer decides to manufacture and/or handle containers of different dimensions than the containers currently being manufactured and/or handled. If and when the time comes to handle different containers, the unfinished container handling components 10' can be finished, i.e., the actual geometry FG can be adapted or adjusted by the processing tool 21 to match or essentially match, within manufacturing tolerances, the proposed geometry VFG. This method provides the customer with great flexibility and the ability to quickly and easily change the type of container to be handled in the container manufacturing machine 1.

The following is at least a partial list of components shown in the figures and their related reference numerals: container manufacturing machine 1; container 2; container handling arrangement 3; first transporter 5; second transporter 6; container handling component 10, 10'; container handling component section 10.1; worm conveyor 12; star pocket 13; processing device 20; processing tool 21; guide and movement device 22; robot arms 22.1; axes 22.2; exchange device 23; suction device 24; detection device 25; carrier 25.1; holding devive 26; tool carrier 27; subsequent processing section 28; control unit 30; processor unit 30.1; storage unit 30.2; first interface 40; second interface 41; data transfer path 42; computer unit 43; display unit 44; interface or connecting arrangement 50; drive unit 51; framework 52; transport direction A; container handling path BS; machine axis MA; direction of rotation B; handling position BP; actual container handling component geometry FG; propsoed container handling component geometry VFG; control and evaluation routine SAR; reference processing data SBD; control and processing data SD; control and processing modules SM; and partition wall TW.

At least one possible exemplary embodiment of the present application relates to a container handling arrangement for handling containers 2 or the like, comprising at least one container handling path BS, wherein, along the container handling path BS, there is provided at least one container handling component 10 with an actual container handling component geometry FG, at least partially adapted to a container geometry of the container 2 or the like which is to be processed, which is arranged in a detachable manner at the container handling arrangement 1, wherein the container handling arrangement 1 comprises at least one processing device 20 for adapting the actual container handling component geometry FG of the at least one container handling component 10 of the container handling arrangement 1 to a container handling component geometry VFG corresponding to the dimensions of the portion of the container to be handled.

At least one other possible exemplary embodiment of the present application relates to the container handling arrangement, wherein the at least one processing device 20 is arranged secured, but in a detachable manner by use of at least one interface 50, to the container handling path BS of the container handling arrangement 1.

At least one other possible exemplary embodiment of the present application relates to the container handling arrangement, wherein the processing device 20 is configured so as to be movable by use of a drive unit 51.

At least one other possible exemplary embodiment of the present application relates to the container handling arrangement, wherein the processing device 20 is configured for adapting the actual container handling component geometry FG to a container handling component geometry VFG corresponding to the dimensions of the portion of the container to be handled, in the fitted and/or dismantled state of the container handling component 10 of the container handling arrangement 1 which is to be processed accordingly.

At least one other possible exemplary embodiment of the present application relates to the container handling arrangement, wherein the processing device 20 comprises, for the adapting of the actual container handling component geometry FG to a container handling component geometry VFG of the container handling component 10, corresponding to the dimensions of the portion of the container to be handled, at least one processing tool 21, assigned to a guide and movement device 22, for the mechanical and/or welding processing of at least one container handling component section 10.1 of the corresponding container handling component 10.

At least one other possible exemplary embodiment of the present application relates to the container handling arrangement, wherein the guide and movement device 22 is configured as a robot kinematics unit, exhibiting several axes of rotation and/or movement, which comprises one or more robot arms 22.1, which in each case are connected to one another such as to be capable of rotating or pivoting about an axis of rotation 22.2.

At least one other possible exemplary embodiment of the present application relates to the container handling arrangement, wherein the at least one processing tool 21 is configured for the material removing and/or grinding and/or build-up welding and/or water-jet based processing of the at least one container handling component section 10.1.

At least one other possible exemplary embodiment of the present application relates to the container handling arrangement, wherein the at least one processing tool 21 is arranged at the guide and movement device 22 by use of an exchange device 23.

At least one other possible exemplary embodiment of the present application relates to the container handling arrangement, wherein a suction device 24 is additionally provided at the guide and movement device 22, next to the at least one processing tool 21.

At least one other possible exemplary embodiment of the present application relates to the container handling arrangement, wherein the container handling arrangement 1 comprises at least one detection device 25, which is configured such as to detect optically the actual container handling component geometry FG, the dimensions of the portion of the container to be handled, and the deviating container handling component section 10.1 which is to be adapted, and then pass this data on further to a control and evaluation unit, for the determination of the type and extent of subsequent processing necessary for one or more subsequent processing sections 28.

At least one other possible exemplary embodiment of the present application relates to the container handling arrangement, wherein the at least one detection device 25 is arranged on a carrier 25.1 and/or the guide and movement device 22.

At least one other possible exemplary embodiment of the present application relates to the container handling arrangement, wherein the at least one detection device 25 is configured as a three-dimensional camera system or as a three-dimensional laser measuring device.

At least one other possible exemplary embodiment of the present application relates to the container handling arrangement, wherein the at least one processing device 20 adapts the at least one container handling component 10, dependent on a control and processing routine SAR carried out in a control unit 30, to the container handling component geometry VFG corresponding to the dimensions of the portion of the container to be handled.

At least one other possible exemplary embodiment of the present application relates to the container handling arrangement, wherein the control unit 30 is configured such that, dependent on the container handling component geometry VFG corresponding to the dimensions of the portion of the container to be handled for the container handling component 10 which is to be processed, it defines, at the at least one container handling component section 10.1 deviating from the predefined container handling component geometry VFG, at least one subsequent processing section 28 on its three-dimensional outer contour, and, starting from this, produces the control and evaluation routine SAR, wherein, following this, the at least one processing tool 21 is guided in a controlled manner by use of the guide and movement device 22 at least to the subsequent processing section 28 which has been determined, and the respective container handling component section 10.1 assigned to the subsequent processing section 28 is specifically adapted by use of the at least one processing tool 21 to the container handling component geometry VFG corresponding to the dimensions of the portion of the container to be handled.

At least one other possible exemplary embodiment of the present application relates to the container handling arrangement, wherein the guide and movement device 22 comprises a holding device 26, which can be assigned to the guide and movement device 22 by use of the exchange device 23.

At least one other possible exemplary embodiment of the present application relates to the container handling arrangement, wherein the processing device 20 comprises a tool carrier 27 for the indexed holding of the container handling components 10.

At least one other possible exemplary embodiment of the present application relates to the container handling arrangement, wherein the processing device 20 is separated from the container handling path BS by use of at least one partition wall TW.

At least one possible exemplary embodiment of the present application relates to a method for adapting container handling components of a container handling arrangement for the handling of containers 2 or the like, comprising at least one container handling path BS, wherein, provided along the container handling path BS is at least one container handling component 10, at least partially adapted to a container geometry of the container 2 or the like which is to be processed, with an actual container handling component geometry FG, which is arranged in a detachable manner at the container handling arrangement 1, wherein the actual container handling component geometry FG of the at least one container handling component 10 is adapted, by use of at least one processing device 20 configured according to at least one of the possible exemplary embodiments disclosed herein, to a container handling component geometry VFG corresponding to the dimensions of the portion of the container to be handled.

At least one possible exemplary embodiment of the present application relates to a container handling arrangement configured to handle and move containers, comprising beverage bottles, cans, and similar containers, along a container handling path in a container manufacturing machine, said container handling arrangement comprising: at least one container handling component 10 being disposed at a position on or along the container handling path; a framework 52 to which said at least one container handling component 10 is detachably connected; said at least one container handling component comprising at least one container handling section configured to handle a handling portion of a container having an actual container geometry manufactured in accordance with a proposed container geometry; said at least one container handling section comprising an actual section geometry unsuitable for handling the handling portion of a container; and at least one processing arrangement being configured and disposed to physically change said at least one container handling section to adapt the actual section geometry to a proposed section geometry suitable to handle the handling portion of a container.

At least one other possible exemplary embodiment of the present application relates to the container handling arrangement, wherein said framework 52 comprises at least one connecting arrangement 50 disposed at at least one position of said container handling path; and said at least one connecting arrangement 50 being configured to detachably connect said at least one processing arrangement to said framework.

At least one other possible exemplary embodiment of the present application relates to the container handling arrangement, wherein said at least one processing arrangement comprises a drive unit configured to move said at least one processing arrangement to different locations.

At least one other possible exemplary embodiment of the present application relates to the container handling arrangement, wherein said at least one processing arrangement is configured to physically change said at least one container handling section upon said at least one container handling component being either connected to said framework in an installed position or not connected to said framework in an uninstalled position.

At least one other possible exemplary embodiment of the present application relates to the container handling arrangement, wherein said at least one processing arrangement comprises at least one processing tool configured to physically change said at least one container handling section; and said at least one processing arrangement comprises a guide and movement device configured to guide and move said at least one processing tool to permit said at least one processing tool to adapt the actual section geometry of said at least one container handling section to said proposed section geometry.

At least one other possible exemplary embodiment of the present application relates to the container handling arrangement, wherein said guide and movement device comprises an arm arrangement comprising a plurality of arm portions connected together in an articulated manner; and said arm portions are configured to be rotated and/or pivoted about a plurality of axes of rotation and movement.

At least one other possible exemplary embodiment of the present application relates to the container handling arrangement, wherein said at least one processing tool is configured to physically change said at least one container handling section by addition or removal of material by at least one of: cutting, grinding, water-jet processing, or welding.

At least one other possible exemplary embodiment of the present application relates to the container handling arrangement, wherein said at least one processing tool is detachably connected to said arm arrangement to permit attachment of different types of processing tools.

At least one other possible exemplary embodiment of the present application relates to the container handling arrangement, wherein said container handling arrangement further comprises a suction device disposed adjacent said at least one processing tool and configured to collect material generated upon physical changing of said at least one container handling section.

At least one other possible exemplary embodiment of the present application relates to the container handling arrangement, wherein said container handling arrangement comprises at least one detection device; said at least one detection device is configured to detect one of: said actual section geometry of said at least one container handling section; or both said actual section geometry of said at least one container handling section and said actual container geometry of the handling portion of a container; said at least one detection device is configured to transmit information detected thereby to a control and evaluation unit for use in determining a control and processing routine of said at least one processing arrangement.

At least one other possible exemplary embodiment of the present application relates to the container handling arrangement, wherein said at least one detection device is mounted on a carrier device and/or said guide and movement device.

At least one other possible exemplary embodiment of the present application relates to the container handling arrangement, wherein said at least one detection device comprises a three-dimensional camera arrangement or as a three-dimensional laser measuring arrangement.

At least one other possible exemplary embodiment of the present application relates to the container handling arrangement, wherein said container handling arrangement comprises a control and evaluation unit operatively connected to said at least one detection device to permit transmission of information detected by said at least one detection device to said control and evaluation unit; and said control and evaluation unit is configured to determine, using the information detected by said at least one detection device, a control and processing routine of said at least one processing arrangement to physically change said at least one container handling section to said proposed section geometry.

At least one other possible exemplary embodiment of the present application relates to the container handling arrangement, wherein said at least one container handling section comprises a container pocket configured to receive and contact the handling portion of a container; said control and evaluation unit is configured to compare said actual section geometry of an outer contour of said container pocket with said proposed section geometry to determine a deviation from said proposed section geometry; said control and evaluation unit is configured to determine said control and processing routine of said at least one processing arrangement based on the deviation from said proposed section geometry; and said at least one processing arrangement is configured to physically change, either by the addition or removal of material, the outer contour of said container pocket to said proposed section geometry and to essentially match either: the actual container geometry of an outer contour of the handling portion of a manufactured container detected by said at least one detection device; or the proposed container geometry of an outer contour of the handling portion of a container to be manufactured.

At least one other possible exemplary embodiment of the present application relates to the container handling arrangement, wherein said arm arrangement comprises a detachable holding device configured to hold said at least one container handling component.

At least one other possible exemplary embodiment of the present application relates to the container handling arrangement, wherein said at least one processing arrangement comprises a tool carrier configured to hold said at least one container handling component in an indexed manner for processing by said at least one processing tool.

At least one other possible exemplary embodiment of the present application relates to the container handling arrangement, wherein said at least one processing tool is separated from the container handling path by at least one partition wall.

At least one possible exemplary embodiment of the present application relates to a method of operating a container handling arrangement configured to handle and move containers, comprising beverage bottles, cans, and similar containers, along a container handling path in a container manufacturing machine, said container handling arrangement comprising at least one container handling component being disposed at a position on or along the container handling path, and a framework to which said at least one container handling component is detachably connected, which said at least one container handling component comprises at least one container handling section configured to handle a handling portion of a container having an actual container geometry manufactured in accordance with a proposed container geometry, said method comprising the steps of: determining that said at least one container handling section comprises an actual section geometry unsuitable for handling the handling portion of a container; and adapting, using at least one processing arrangement being configured and disposed to physically change said at least one container handling section, the actual section geometry to a proposed section geometry suitable to handle the handling portion of a container.

At least one other possible exemplary embodiment of the present application relates to the method, wherein said step of adaptation is performed while said at least one container handling component is connected to said framework or at a location adjacent said container handling arrangement.

At least one other possible exemplary embodiment of the present application relates to the method, wherein said method further comprises: comparing, using a control and evaluation unit, said actual section geometry with said proposed section geometry and determining a deviation from said proposed section geometry; determining, based on said deviation, a control and processing routine of said at least one processing arrangement; operating at least one processing tool of said at least one processing arrangement in accordance with said control and processing routine, and thereby physically changing, either by addition or removal of material, the actual section geometry to the proposed section geometry to essentially match either: the actual container geometry of an outer contour of the handling portion of a manufactured container, as detected by at least one detection device; or the proposed container geometry of an outer contour of the handling portion of a container to be manufactured.

Any numerical values disclosed herein, if any, should be understood as disclosing all approximate values within plus or minus ten percent of the numerical value. Any ranges of numerical values disclosed herein, if any, should be understood as disclosing all individual values within the range of values, including whole numbers, tenths of numbers, or hundredths of numbers.

The entirety of the appended drawings, including all dimensions, proportions, and/or shapes disclosed thereby or reasonably understood therefrom, are hereby incorporated by reference.

All of the patents, patent applications, patent publications, and other documents cited herein, are hereby incorporated by reference as if set forth in their entirety herein.

The corresponding foreign or international patent applications, as originally filed and as published, from which the present application claims the benefit of priority, are hereby incorporated by reference as if set forth in their entirety herein, as follows: International Patent Application No. PCT/EP2020/055507, filed Mar. 3, 2020; International Patent Publication WO2020207665, published Oct. 15, 2020; and Federal Republic of Germany Patent Application No. DE102019109446.1, filed Apr. 10, 2019.

The following patents, patent applications, patent publications, and other documents cited in the corresponding foreign or international patent applications listed in the preceding paragraph are hereby incorporated by reference as if set forth in their entirety herein, as follows: WO2018228727; EP2138432; EP2383081; DE102011054890; DE202014100458; and WO2014044351.

Although the invention has been described in detail for the purpose of illustration of any embodiments disclosed herein, including the most practical or preferred embodiments at the time of filing of this application, it is to be understood that such detail is solely for that purpose and that the invention is not limited to such embodiments, but, on the contrary, is intended to cover modifications and equivalent arrangements that are within the spirit and scope of the present application, including the specification and the claims as originally filed, as amended, or as issued. For example, it is to be understood that the present invention contemplates that, to the extent possible, one or more features or components of any disclosed embodiment can be combined with one or more features or components of any other disclosed embodiment.

What is claimed is:

1. A container handling arrangement configured to handle and move containers, comprising beverage bottles, cans, and similar containers, along a container handling path in a container manufacturing machine, said container handling arrangement comprising:
   at least one container handling component being disposed at a position on or along the container handling path;
   a framework to which said at least one container handling component is detachably connected;
   said at least one container handling component comprising at least one container handling section configured to handle a handling portion of a container having an actual container geometry manufactured in accordance with a proposed container geometry;
   said at least one container handling section comprising an actual section geometry unsuitable for handling the handling portion of a container; and
   at least one processing arrangement being configured and disposed to physically change said at least one container handling section to adapt the actual section geometry to a proposed section geometry suitable to handle the handling portion of a container, while the at least one container handling component is connected to the framework or at a location adjacent the container handling arrangement; and
   a control and evaluation unit for comparing the actual section geometry with the proposed section geometry and determining a deviation from the proposed section geometry, and based on the deviation, determining a control and processing routine of said at least one processing arrangement;

said at least one processing arrangement having at least one processing tool to physically change, in accordance with said control and processing routine and either by addition or removal of material, the actual section geometry to the proposed section geometry to substantially match either:

the actual container geometry of an outer contour of the handling portion of a manufactured container, as detected by at least one detection device; or the proposed container geometry of an outer contour of the handling portion of a container to be manufactured.

2. The container handling arrangement according to claim 1, wherein:

said framework comprises at least one connecting arrangement disposed at at least one position of said container handling path; and said at least one connecting arrangement being configured to detachably connect said at least one processing arrangement to said framework.

3. The container handling arrangement according to claim 2, wherein said at least one processing arrangement comprises a drive unit configured to move said at least one processing arrangement to different locations.

4. The container handling arrangement acc rding to claim 3, wherein said at least one processing arrangement is configured to physically change said at least one container handling section upon said at least one container handling component being either connected to said framework in an installed position or not connected to said framework in an uninstalled position.

5. The container handling arrangement according to claim 4, wherein:

said at least one processing arrangement comprises a guide and movement device configured to guide and move said at least one processing too to permit said at least one processing tool to adapt the actual section geometry of said at least one container handling section to said proposed section geometry.

6. The container handling arrangement according to claim 5, wherein:

said guide and movement device comprises an arm arrangement comprising a plurality of arm portions connected together in an articulated manner; and said arm portions are configured to be rotated and/or pivoted about a plurality of axes of rotation and movement.

7. The container handling arrangement according to claim 6, wherein said at least one processing tool is configured to physically change said at least one container handling section by addition or removal of material by at least one of: cutting, grinding, water-jet processing, or welding.

8. The container handling arrangement according to claim 7, wherein: said at least one processing tool is detachably connected to said arm arrangement to permit attachment of different types of processing tools.

9. The container handling arrangement according to claim 8, wherein:

said container handling arrangement further comprises a suction device disposed adjacent said at least one processing tool and configured to collect material generated upon physical changing of said at least one container handling section.

10. The container handling arrangement according to claim 9, wherein said at least one detection device is configured to detect one of:

said actual section geometry of said at least one container handling section; or both said actual section geometry of said at least one container handling section and said actual container geometry of the handling portion of a container;

said at least one detection device is configured to transmit information detected thereby to the control and evaluation unit for use in determining a control and processing routine of said at least one processing arrangement.

11. The container handling arrangement according to claim 10, wherein said at least one detection device is mounted on a carrier device and/or said guide and movement device.

12. The container handling arrangement according to claim 11, wherein said at least one detection device comprises a three-dimensional camera arrangement or as three dimensional laser measuring arrangement.

13. The container handling arrangement according to claim 12, wherein:

said control and evaluation unit is operatively connected to said at east one detection device to permit transmission of information from said at least one detection device to said control and evaluation unit; and said control and evaluation unit is configured to determine; using the information detected by said at least one detection device, a control and processing routine of said at least one processing arrangement to physically change said at least one container handling section to said proposed section geometry.

14. The container handling arrangement according to claim 13, wherein:

said least one container handling section comprises a container pocket configured to receive and contact the handling portion of a container;

said control and evaluation unit is configured to compare said actual section geometry of an outer contour of said container pocket with said proposed section geometry to determine a deviation from said proposed section geometry;

said control and evaluation unit is configured to determine said control and processing routine of said at least one processing arrangement based on the deviation from said proposed section geometry; and said at least one processing arrangement is configured to physically change, either by the addition or removal of material, the outer contour of said container pocket to said proposed section geometry and to essentially match either:

the actual container geometry of an outer contour of the handling portion of a manufactured container detected by said at least one detection device; or the proposed container geometry of an outer contour of the handling portion of a container to be manufactured.

15. The container handling arrangement according to claim 14, wherein said arm arrangement composes a detachable holding device configured to hold said at least one container handling component.

16. The container handling arrangement according to claim 15, wherein said at least one processing arrangement composes a tool carrier configured to hold said at least one container handling component in an indexed manner for processing by said at least one processing tool.

17. The container handling arrangement according to claim 16, wherein said at least one processing tool is separated from the container handling path by at least one partition wall.

18. A method of operating a container handling arrangement configured to handle and move containers, comprising beverage bottles, cans, and similar containers, along a container handling path in a container manufacturing machine, said container handling arrangement comprising at least one container handling component being disposed at a position on or along the container handling path, and a framework to which said at least one container handling component is detachably connected, which said at least one container handling component comprises at least one container handling section configured to handle a handling portion of a container having an actual container geometry manufactured in accordance with a proposed container geometry, said method comprising the steps of:

determining that said at least one container handling section comprises an actual section geometry unsuitable for handling the handling portion of a container; and adapting, using at least one processing arrangement being configured and disposed to physically change said at least one container handling section, the actual section geometry to a proposed section geometry suitable to handle the handling portion of a container;

wherein the step of adapting is performed while said at least one container handling component is connected to said framework or at a location adjacent said container handling arrangement;

comparing, using a control and evaluation unit, said actual section geometry with said proposed section geometry and determining a deviation from said proposed section geometry;

determining, based on said deviation, a control and processing routine of said at least one processing arrangement;

operating at least one processing tool of said at least one processing arrangement in accordance with said control and processing routine, and thereby physically changing, either by addition or removal of material, the actual section geometry to the proposed section geometry to substantially match either:

the actual container geometry of an outer contour of the handling portion of a manufactured container, as detected by at least one detection device; or the proposed container geometry of an outer contour of the handling portion of a container to be manufactured.

19. A container handling arrangement configured to handle and move containers, comprising beverage bottles, cans, and similar containers, along a container handling path in a container manufacturing machine, said container handling arrangement comprising:

at least one container handling component being disposed at a position on or along the container handling path;

a framework to which said at least one container handling component is detachably connected;

said at least one container handling component comprising at least one container handling section configured to handle a handling portion of a container having an actual container geometry manufactured in accordance with a proposed container geometry;

said at least one container handling section comprising an actual section geometry unsuitable for handling the handling portion of a container; and at least one processing arrangement being configured and disposed to physically change said at least one container handling section to adapt the actual section geometry to a proposed section geometry suitable to handle the handling portion of a container;

wherein said framework comprises at least one connecting arrangement disposed at at least one position of said container handling path; and wherein said at least one connecting arrangement is configured to detachably connect said at least one processing arrangement to said framework.

* * * * *